United States Patent [19]

Maget

[11] Patent Number: 5,334,304
[45] Date of Patent: Aug. 2, 1994

[54] ELECTROCHEMICAL FORCE SENSOR

[76] Inventor: Henri J. R. Maget, 6455 La Jolla Blvd., La Jolla, Calif. 92037

[21] Appl. No.: 793,459

[22] Filed: Nov. 18, 1991

Related U.S. Application Data

[63] Continuation-in-part of Ser. No. 563,051, Aug. 6, 1990, abandoned.

[51] Int. Cl.$^5$ .................. G01N 27/406; G01N 27/417
[52] U.S. Cl. ................................ 204/421; 204/408; 204/424; 204/427
[58] Field of Search ................. 204/153.18, 421–429, 204/408

[56] References Cited

U.S. PATENT DOCUMENTS

| | | | |
|---|---|---|---|
| 2,913,511 | 11/1959 | Grubb | 429/30 |
| 3,334,623 | 8/1967 | Hillier et al. | 204/415 |
| 3,342,558 | 9/1967 | Reinecke | 204/421 |
| 3,400,054 | 9/1968 | Ruka et al. | 204/153.18 |
| 3,442,773 | 5/1969 | Wilson | 204/153.18 |
| 3,503,861 | 3/1970 | Volpe | 204/415 |
| 3,510,421 | 5/1970 | Gealt | 204/415 |
| 3,978,006 | 8/1976 | Topp et al. | 204/429 |
| 4,024,035 | 5/1977 | Nakamura et al. | 204/427 X |
| 4,024,036 | 5/1977 | Nakamura et al. | 204/427 |
| 4,158,166 | 6/1979 | Isenberg | 204/426 |
| 4,365,604 | 12/1982 | Sone | 204/424 |
| 4,402,817 | 9/1983 | Maget | 204/301 |
| 4,472,262 | 9/1984 | Kondo et al. | 204/408 |
| 4,522,698 | 6/1985 | Maget | 204/301 |
| 4,648,955 | 3/1987 | Maget | 204/258 |
| 4,661,211 | 4/1987 | Petty-Weeks | 204/424 |
| 4,687,423 | 8/1987 | Maget et al. | 417/379 |
| 4,718,991 | 1/1988 | Yamazoe et al. | 204/424 |
| 4,886,514 | 12/1989 | Maget | 604/891.1 |
| 4,902,278 | 2/1990 | Maget et al. | 604/132 |
| 5,149,413 | 9/1992 | Maget | 204/258 |

OTHER PUBLICATIONS

Hackh's *Chemical Dictionary*, 5th ed., 1987, p. 598.

*Primary Examiner*—T. Tung
*Attorney, Agent, or Firm*—Spensley Horn Jubas & Lubitz

[57] ABSTRACT

A gas or fluid pressure or force sensor is disclosed consisting of a fluid-tight housing containing a supply of electrochemically active gas and an electrolytic membrane disposed to divide the housing into two chambers. The electrolytic membrane has one or more pervious electrodes disposed on each side of and in contact with the membrane. A flexible bellows or diaphragm is disposed to form one wall of the fluid-tight housing and provide the contacting surface for transferring a force or pressure to the sensor. A controller is connected to display measurements and to permit automatic sensor calibration, differential pressure-induced diffusion compensation, temperature compensation and sensor chamber pressure control. The disclosed force sensor is useful for application to robotic manipulators and the basic device is useful for measurement of the gas partial-pressure of a selected gas.

13 Claims, 4 Drawing Sheets

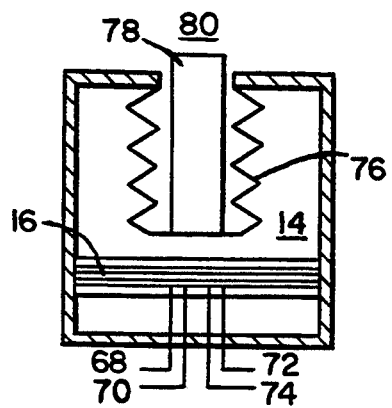
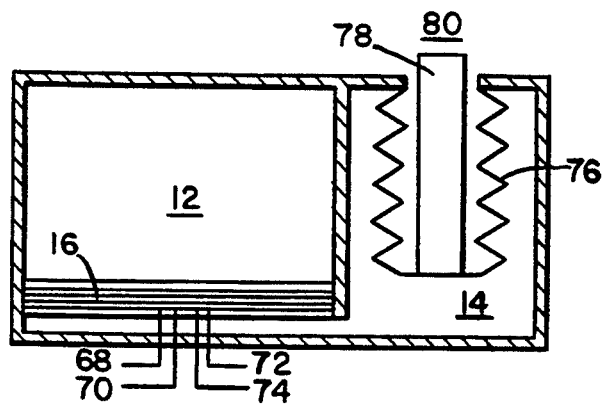
FIG. 8A    FIG. 8B
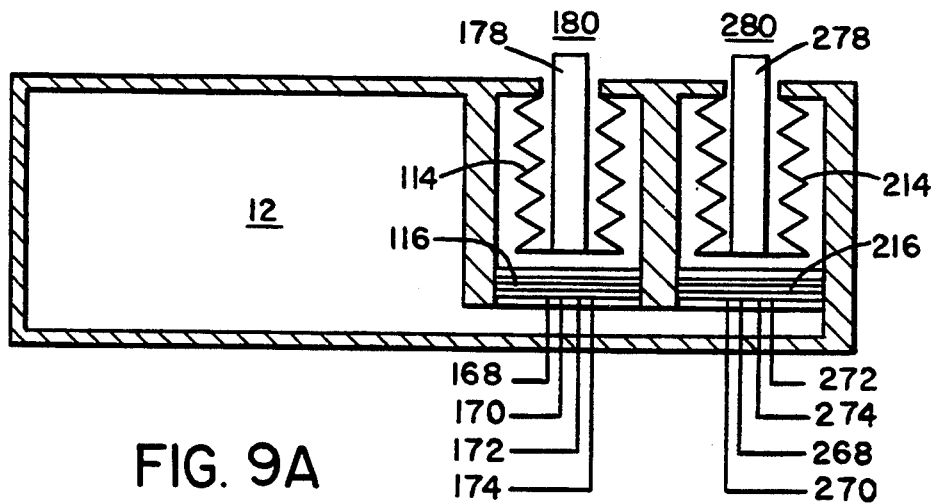
FIG. 9A
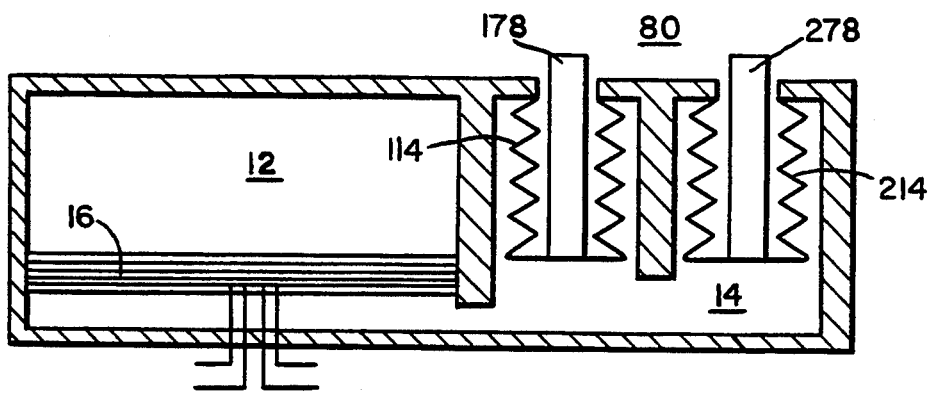
FIG. 9B

ELECTROCHEMICAL FORCE SENSOR

This is a continuation in part of Ser. No. 07/563,051, filed Aug. 6, 1990, now abandoned.

BACKGROUND OF THE INVENTION

1. Field of the Invention

This invention involves generally devices for sensing and effecting force and pressure and more particularly involves a pressure transducer that reversibly converts mechanical force or pressure into an electrical voltage by means of an electrochemical process.

2. Description of the Related Art

Several methods for measuring force and pressure are known in the art. Except for gravity column measurements, such methods generally use a pressure transducer to convert applied pressure to an electrical voltage. Pressure transducers generally rely on an intermediate physical displacement induced by the applied pressure to generate an electrical voltage. The transduction principles or means of transforming a change in physical displacement into a change in electrical voltage or current circuit are as varied as the many physical relationships known to modern science. However, the transduction techniques in general use are limited to a relative few. These are essentially those which involve variations in resistance, inductance, and reluctance. Useful data are obtained by supplying such transducers with an input voltage and developing an output voltage as a function of the changes in displacement produced as an intermediate result of the application of the pressure or force to be measured.

Of the remaining transduction principles, the piezoelectric and vibrating-wire types are most commonly used. The piezoelectric transducer uses a crystalline material that produces an output voltage proportional to the rate of change in strain over time. Because the output voltage is generated only under dynamic conditions, the piezoelectric device cannot be used for static or steady-state pressure or force measurements. It is normally used as a miniature instrument intended to measure vibration or dynamic pressure.

The vibrating-wire transducer comprises a fine wire supported so that its tension and strain varies according to the applied pressure or force. When this wire lies between the poles of a permanent magnet, it vibrates at its natural frequency upon application of an oscillating voltage. The vibrating-wire transducer output is an oscillating voltage that changes in frequency according to changes in the wire tension induced by the applied pressure or force.

Each of these transducer principles requires a displacement to generate a voltage output from the sensor. Pressure measurements are achieved by summing applied pressure over a flexible material that in turn is permitted limited travel. The flexible member may be a diaphragm, capsule, bellows or several variations of bourdon tubes. Each of these provides a limited displacement under applied pressure. Absolute pressures are generally determined by sealing either the capsule or bellows assembly, or the instrument chamber, at a reference pressure usually close to zero. Gauge pressure (relative to ambient atmospheric pressure) is generally measured by connecting the reference side of the instrument to the ambient condition. Differential pressure can be measured by permitting the two pressures in question access to opposite sides of the sensing member.

Each of the above-mentioned transduction techniques is subject to several limitations. Except for the piezoelectric transducer, all such methods require a separate voltage source. The piezoelectric transducer requires no separate voltage source, but it is not useful for static pressure measurement. Again except for the piezoelectric transducer, none of the above transduction techniques are amenable to self-calibration. Although a piezoelectric transducer can be self-calibrated by means of the reciprocity principle, this method is useful only for dynamic (sinusoidally-varying) pressures. A simple, self-calibrating pressure sensor that can be calibrated to accurately sense the absolute value of static pressure without reference to a calibration standard is unknown in the art.

In addition to the simple measurement of force or pressure, two other related sensing requirements exist in the art. First, there is often a requirement for measurement of the partial-pressure of a gas in a mixture of gases. For instance, the direct sensing of the partial-pressure of oxygen ($O_2$) is required in the arts of medicine, biology, automotive engineering, chemistry, petroleum engineering, and others. Secondly, in the emerging robotics arts there is a well-known requirement for a transducer that combines the capacity to sense force or pressure with the capacity to effect a desired force or pressure. Such a device may be considered a force or pressure sensor/effector and is useful for robotic manipulators. The above-mentioned force transduction techniques cannot meet either of these important requirements because the transduction phenomenon is either nonreversible or the case of the piezoelectric transducer) the transduction phenomenon does not exist under static conditions.

Another method for measuring the partial pressure of oxygen was demonstrated by R. Richter at Jet Propulsion Laboratory in 1984, as reported in Richter, R., "Measuring Absolute Oxygen Pressure," NASA Tech Brief 8, No. 3, Item #97. Richter did his work with a high temperature ($>1000°$ C.) zirconia-electrolyte fuel cell, using it to measure the partial-pressure of oxygen. Richter's method is not useful for measuring the partial-pressure of other electrochemically active gases (eg. $H_2$, $Cl_2$, et al) at ambient temperature.

An electrochemical cell is typically formed by positioning an electrolytic membrane between and in contact with a cathode and an anode. Although such a cell can either generate electricity (as a fuel cell) or do mechanical work (as a motor), it has not heretofore been used as a transducer for the sensing or effecting of force and pressure. When the cell is configured as a fuel cell to generate electricity, a fuel gas such as hydrogen is supplied to the anode and a gaseous oxidant such as oxygen is supplied to the cathode, as disclosed by Wentworth in U.S. Pat. No. 3,418,168. When the cell is configured as a motor to produce mechanical energy, an electrical voltage is applied across the anode and cathode and an electrochemically active gas capable of entering into an oxidation/reduction reaction is supplied to the anode, as disclosed in my U.S. Pat. No. 4,402,817. Neither of these patents teaches or suggests the use of an electrochemical cell as a force or pressure sensor. Such an application is briefly disclosed by in my copending patent application U.S. Ser. No. 07/563,050 entitled "Efficient Electrochemical Motor" filed concurrently herewith.

SUMMARY OF THE INVENTION

The present invention is an electrochemical reactive force sensor that uses an electrochemical membrane as a pressure transducer for reversibly converting a pressure differential across the membrane to an electrical voltage. The present invention provides a reactive contact sensor capable of sensing and reacting to contact forces. This is accomplished by an embodiment that integrates the electrochemical membrane sensor and reactive driver into a single component operated by a simple micro-controller. The present invention also provides a simple, self-calibrating, passive pressure sensor that gives an accurate measurement of absolute pressure, without reference to a pressure standard, through the use of a simple self-calibrating procedure. An advantage of the present invention is that it provides, through an alternative embodiment, a direct partial-pressure gas sensor for several electrochemically active gases such as oxygen ($O_2$), hydrogen ($H_2$), and several of the halogens.

The present invention offers several advantages over the related art. The electrochemical transduction phenomenon is reversible, which means that the present invention is well-suited for both sensing and applying or effecting a force. The precision of the electrochemical force sensor/effector exceeds 0.05% without special provision for internal calibration because of the nature of the transduction phenomenon.

An additional advantage arising from the reversibility of the transduction phenomenon is the capability for a simple self-calibrating procedure. The dual-chamber embodiment of the electrochemical pressure sensor can be self-calibrated merely by first measuring the output voltage, applying a known direct current for a known period of time, and remeasuring the output voltage. Using a simple algebraic relationship, the absolute pressure of the electrochemical gas on both sides of the electrolytic membrane can be calculated with an accuracy and precision limited only by the electrical voltage and current measurement means. The applicable formula can be understood from an examination of the electrochemical transduction phenomenon, wherein the current flow through the electrolytic membrane is equal to the number of ions transported across the membrane per unit time. Because the gas pressure ratio across the electrolytic membrane is also related to the number of ions (gas molecules) transported across the membrane, an exact relationship exists between membrane current and membrane pressure ratio. That is, the number of electrons flowing is precisely related to the number of gas molecules transported, except for diffusion losses induced by the pressure differential across the electrolytic membrane. Simple control means for applying a bias current to the electrolytic membrane in response to the sensor voltage output will compensate for diffusion losses. That is, a counter-diffusion gas flow can be automatically induced by a controller in response to a diffusion estimate computed for the measured pressure differential.

Yet another advantage of the present invention arising from the reversibility of the electrochemical transduction phenomenon is the capacity for effecting a desired force using the same sensing device. This has application to the robotic arts for use in a mechanical gripper or manipulator. Most contact sensors are passive. Mechanical effectors require considerable feedback and computation to allow a manipulator to react to contact forces. The present invention permits an embodiment that can sense and react to contact forces with simple local control means involving simple feedback of sensor output voltage to a means for applying current to the electrolytic membrane. The force applied by the effector/sensor responds immediately and precisely to the applied current.

Because the electrolytic membrane will transport only molecules of the electrochemically active gas involved in the ionic reaction at the membrane surface, the present invention is uniquely suited to the measurement of partial-pressure of selected electrochemically active gases such as hydrogen, oxygen, and the halogens. In fact, if one surface of the electrolytic membrane is exposed to the gas under measurement, the electrolytic membrane output voltage will always be directly related to the ratio of partial-pressures across the electrolytic membrane and not to the ratio of gas mixture pressures.

Another advantage of the present invention is its suitability for miniaturization. The output voltage from the electrolytic membrane is not related to the membrane area. Thus, for instance, membranes with areas of less than 2 $mm^2$ can function effectively as pressure sensors for use within catheters for measurement of internal blood and tissue pressures. Because the typical pressure sensor transducer known in the art relies on some physical displacement to generate the transducer output signal, these sensors often comprise a number of moving parts, thereby limiting the practicality of miniaturization.

Finally, the present invention offers the additional advantages of high efficiency, low power requirements, and flexible geometry. All of these advantages together with the absence of moving parts (other than a flexing bellows or diaphragm) result in a low production cost for the preferred embodiments of the present invention.

The elements of a single-chamber embodiment of the present invention include an electrochemical cell placed in a sensor housing with means for electrically connecting to both sides of the electrochemical cell. A dual-chamber pressure or force sensor embodiment further comprises a diaphragm or bellows at one end of the housing for transmitting external pressure to one of the two internal gas chambers. Each of the two internal gas chambers is filled with an electrochemically active gas, preferably hydrogen. One of the two gas chambers comprises a temperature sensor. Sensor/effector control means responsive to the temperature sensor output and the electrochemical cell output voltage provide the bias current necessary to compensate for differential-pressure-induced gas diffusion across the membrane and the signals necessary to compute and display the pressure value sensed by the device.

An integrated sensor/effector embodiment includes an additional micro-controller for the electrochemical cell drive current and is responsive to the electrochemical cell output voltage (sensed pressure) and a remote robotics-controller signal that establishes the desired contact. This local micro-controller responds to the sensed force by changing the drive current and thereby the gas pressure under the diaphragm or bellows. The locally-controlled pressure change constitutes a physical contact interaction with the external environment useful for robotic mechanical manipulators.

The present invention is also ideally suited for application as an internal pressure sensor in an electrochemical motor as disclosed in my copending application U.S. Ser. No. 07/563,050, previously discussed.

The foregoing, together with other features and advantages of the present invention, will become more apparent when referring to the following specifications, claims and accompanying drawings.

BRIEF DESCRIPTION OF THE DRAWINGS

For a more complete understanding of the present invention, reference is now made to the following detailed description of the embodiments illustrated in the accompanying drawings, wherein:

FIG. 2, comprising

FIG. 7, comprising

FIG. 8, comprising FIGS. 8A and 8B, illustrates two configurations of an electrochemical force sensor/effector having a bellows and piston contactor arrangement; and FIG. 9, comprising FIGS. 9A and 9B, illustrates two multiple force sensor/effector configurations with robotic manipulator applications.

DESCRIPTION OF THE PREFERRED EMBODIMENTS

Three illustrated embodiments of the present invention are of primary interest as pressure and force sensors and effectors.

Figure 1:
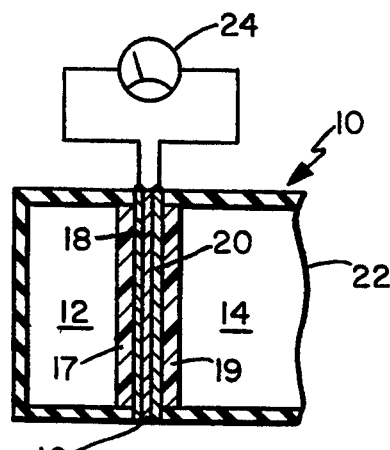
FIG. 1 is a schematic illustration of a dual-chamber electrochemical pressure sensor.

FIG. 1 illustrates a dual-chamber pressure sensor 10 showing a reference chamber 12 and a sensing chamber 14 separated by a rigidly-supported electrolytic membrane 16 having pervious conductors 18 and 20 on either side of membrane 16 and rigid supporting printed-circuit boards (PCB's) 17 and 19 on either side of the electrode/ionomer assembly. Sensing chamber 14 comprises a flexible diaphragm 22 which deforms under the external measured pressure, until the pressure within sensing chamber 14 is equal to the external measured pressure. Both chambers 12 and 14 contain an electrochemically active gas. Rigid supports 17 and 19 and electrodes 18 and 20 are pervious to the electrochemically active gas, permitting the gas molecule to move from the electrode surface to the surface of the ionomer 16.

When the pressure in chamber 12 is different from chamber 14, well-known processes occur which result in the reduction of gas molecules at the surface between electrode 18 and ionomer 16 and oxidation of gas ions at the interface between ionomer 16 and electrode 20. As part of this process, in the case of hydrogen gas, an electron is removed from electrode 18 for each such reduction and an electron is added to electrode 20 for each such oxidation. This process is reversed merely by inverting the pressure ratio of chambers 12 and 14. The overall process results in a voltage between electrodes 18 and 20, which can be measured by voltmeter 24. If the internal impedance of voltmeter 24 is very high, no current will flow between electrodes 18 and 20 and no ionic transport will occur across membrane 16, thereby maintaining the relative pressure difference between chambers 12 and 14 indefinitely, except for pressure-induced diffusion losses.

The practical application of this electrochemical transduction phenomenon requires the use of a rigidly-supported electrolytic cell illustrated as a combination of membrane 16, electrodes 18 and 20, and PCB's 17 and 19 in FIG. 1. Such a cell or separator must have a high ionic conductivity and low gaseous diffusion induced by the pressure differential across the separator. Proton conducting organic ionomer membranes, such as perfluorosulfonated ionomer membranes are well-suited for this purpose and are well-known in the art. For instance, refer to "Ion Exchange Membrane Fuel Cells" by H. Maget, *Handbook of Fuel Cell Technology*, C. Berger, Editor, Prentice-Hall, 1968. Also, refer to LaConti, A. B., et al., "Electrode Materials and Processes for Energy Conversions," ECS Proceedings, pp 354–374, 1977. Particularly preferred of this class of organic membranes are those of perflurosulfonic acid, commonly known as Nafion.

Figure 2A:
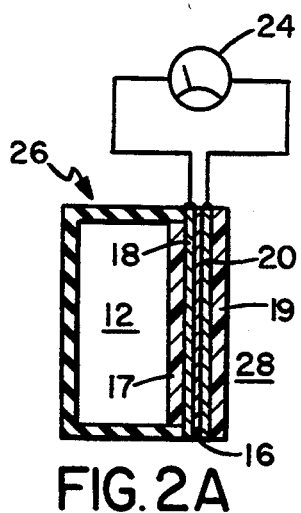
FIGS. 2A and 2B, is a schematic illustration of two different versions of a single-chamber electrochemical partial-pressure sensor.

The second illustrated embodiment of interest is the partial-pressure gas sensor illustrated in FIG. 2. FIG. 2A shows a gas sensor 26 having reference chamber 12 and an electrochemical cell comprising membrane 16, electrodes 18 and 20, and rigid supports 17 and 19 exposed to the gas pressure to be measured. Reference chamber 12 contains an electrochemically active gas, which can be oxygen. If electrode 20 is exposed to an air mixture, the oxidation-reduction process occurring across the electrochemical cell will induce a voltage between electrodes 18 and 20 which is related to the ratio of the electrochemically active gas pressure in reference chamber 12 to the electrochemically active gas pressure in air mixture 28. Thus, it is seen that the embodiment illustrated in FIG. 2A acts to measure the partial pressure of the electrochemically active gas component of air mixture 28. The desired component, whether hydrogen, oxygen or a selected halogen, is established by the chemical properties of the electrochemically active gas contained in reference chamber 12.

Figure 2B:
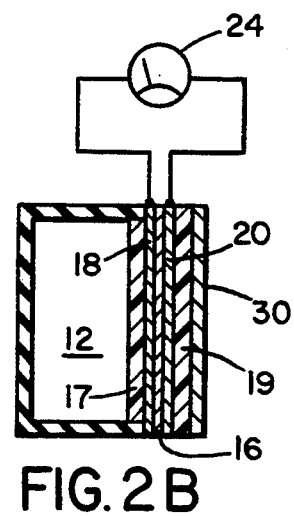

Referring to FIG. 2B, a similar partial-pressure gas sensor embodiment is illustrated. However, a semi-pervious membrane 30 is added to cover the electrochemical cell assembly to prevent evaporation of the moisture content of ionomer 16. Membrane 30 is selected to be pervious to the electrochemical gas to be measured while also being impervious to moisture.

The third illustrated embodiment of interest is the dual-chamber force sensor shown in FIG. 8, which is discussed in detail later below.

Figure 3A:
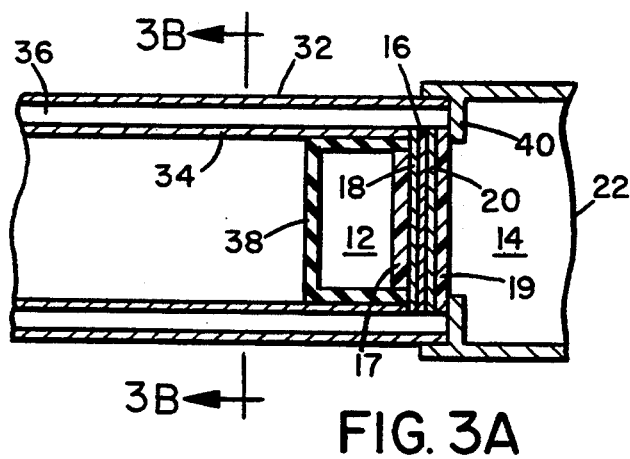
FIG. 3A is a schematic illustration of an electrochemical pressure sensor used as an integral part of a catheter and FIG. 3B is a section through FIG. 3A as indicated.
Figure 3B:
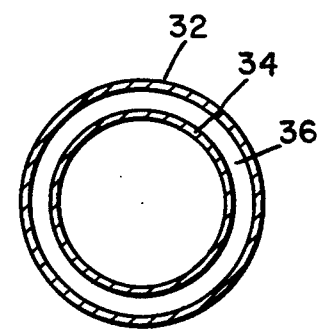

Referring to FIG. 3, dual-chamber pressure sensor 10 is incorporated in a catheter-based embodiment suitable for medical applications. FIG. 3B shows a section through FIG. 3A illustrating the conductors 32 and 34 plated on the outside and inside, respectively, of the catheter tube 36. Conductors 32 and 34 provide connection means to electrodes 18 and 20 for monitoring the output voltage of the electrochemical cell in response to the pressure ratio to reference chamber 12 to sensing chamber 14. Catheter 36 is substantially 1.6 mm in diameter. The electrical connection to electrode 18 is provided by contact with rigid conducting wall 38 in contact with inner-plated electrode 34. Electrical connection to electrode 20 is provided by metallic inset 40 in contact with outer plated electrode 32.

Figure 4:
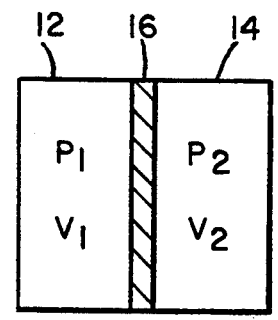
FIG. 4 is a schematic illustration of a single gas storage chamber bisected by an electrolytic membrane.

To illustrate the electrochemical pressure-sensing phenomenon in more detail, consider FIGS. 1 and 4. The volumes of chambers 12 and 14 need not be identical or in any particular relationship. Reference chamber 12 contains a known amount of electrochemically active gas, such as oxygen or hydrogen, and is used as a reference pressure. In FIG. 4, this reference pressure is $P_1$. If sensing chamber 14 is initially also at pressure $P_1$, the system is in equilibrium and the voltage at voltmeter 24 is zero. If the external pressure increases to $P_2$, a pressure differential is created between chambers 12 and 14. This condition is described by the thermodynamic relationship:

$$V = (RT/nF) \ln (P_2/P_1) \quad (1)$$

where:

V = voltage between electrodes 18 and 20 in volts resulting from pressure difference,
R = gas constant,
T = absolute temperature in °K.,
n = the number of electrons involved in the electrochemical redox process per molecule of active gas (n = 2 for the redox couple hydrogen/hydrogen), and
F = Faraday constant.

The coefficient (RT/nF) is substantially equal to 13 mV at room temperature. If $P_R$ is defined as the pressure ratio $P_2/P_1$ and if $P_R$ approaches unity, Equation (1) can be rewritten as:

$$V = 0.03 \, (P_R - 1) \quad (2)$$

Equation (2) is valid for an electrochemical pressure sensor using hydrogen as the electrochemically active gas. For example, if $P_R$ equal 1.01, voltmeter 24 will read a voltage of 0.13 mV.

Because sensor 10 is completely enclosed and sealed, the pressure in chamber 12 may assume any value, including zero. The electrochemical pressure sensor can operate at any pressure level up to the mechanical limits of membrane 16. To prevent excessive pressure differentials across membrane 16, reference pressures in reference chamber 12 can be established to approximate the external pressure to be measured in sensor chamber 14.

Obviously, gases other than hydrogen may be used. Suitable gases include any that can participate in a reversible redox reaction, such as oxygen/water, chlorine/hydrochloric acid, etc. To illustrate the use of other redox couples, consider the oxygen/water system. If oxygen is present in chambers 12 and 14, and if water is available within the electrolyte in ionomer 16, then all the chemical components of the redox couple are available. Equations (1) and (2) are applicable except that n = 4 and Equation (2) becomes V = 0.0065 (R−1).

Membrane 16 in FIG. 1 can be from about 5 to about 20 mils thick (0.13 mm to 0.50 mm). In combination with the otther elements of the inventive sensor, membrane 16 allows the sensor to be effectively operated within a temperature range which is substantially lower than the range required for operation of prior art devices. In the use of the sensor as a hydrogen sensor, this same temperature range—0 C to 100 C—applies.

Electrodes 18 and 20 should be sufficiently electrochemically active to avoid undesirable and unpredictable overpotentials and may consist of platinum or palladium metal black, rigidly supported by porous metal or non-conducting rigid supports 17 and 19. Electronic conduction from electrodes 18 and 20 can be provided by metal screen or similar current carriers.

The design of electrodes 18 and 20 will vary with the intended application. Electrodes 18 and 20 may comprise several isolated pairs covering separate portions of the surface area of membrane 16. These pairs may be interconnected for enhanced output voltage, or separately connected for active pumping, passive sensing, or both, using well-known electrical techniques. Two isolated pairs are preferred for the active/passive applications shown in FIGS. 5, 8 and 9, although a single pair can provide both active and passive functions with the appropriate control means as disclosed later below in connection with FIG. 6.

The design of chambers 12 and 14 is not critical because the sensor output is related to the ratio of pressures rather than the rate of ionic transfer across membrane 16. Diaphragm 22 can also be a bellows or other similar flexible structure designed to respond to pressure fluctuations.

In FIG. 2A, if chamber 12 is filled with oxygen or air, sensor 26 will function as an oxygen sensor. To avoid contamination or drying of ionomer 16, protective film 30 can be placed over electrode 20 as shown in FIG. 2B. Film 30 can be a silicon sheet or other similar semi-pervious material.

The illustrated embodiments of the present invention are capable of converting pressure ratios into voltage according to Equation 1 above. Either a known reference pressure or the self-calibration method discussed below will enable the illustrated embodiments to accurately measure absolute pressure. One useful method for providing a known reference pressure is to pump reference chamber 12 down to a high vacuum (zero pressure). However, electrochemical active gases tend to diffuse across ionomer 16 in response to the pressure difference between chambers 12 and 14, eventually achieving pressure equality between chambers 12 and 14. An important part of the present invention comprises means for inducing a gas counterflow canceling the pressure-induced diffusion across membrane 16. This is accomplished by applying a bias current in the direction opposite to the diffusion flux. The equilibration involves the following parameters:

Voltage due to pressure ratio, $V = 0.013 \ln P_2/P_1$ (for hydrogen/hydrogen);

Gas flux induced by the pressure differential, $F = A(P_1 - P_2)$, where the proportionality factor, A, can be known accurately.

If a current I is applied to oppose flux F, then $I = -kA(P_2 - P_1)$ where k is the factor is relating current to gas flow.

Current I can be obtained from the above:

$$I = -kAP_1(P_2/P_1 - 1) = -kAP_1[\exp(nF/RT)V - 1] \quad (3)$$

At room temperature, Equation (3) yields $$I = -kAP_1[\exp(V/0.013) - 1] \text{ and,}$$

for very small pressure differences, $$I = -kAP_1V/0.013 \tag{4}$$

Thus, we see that a diffusion flux compensation bias current can be computed from voltage V measured by voltmeter 24 in FIG. 1 and initial pressure $P_1$ in reference chamber 12. This bias current is useful for maintaining accuracy in sensors operating over high pressure ranges but is not necessary for sensors operating over low pressure ranges.

To illustrate this, consider the embodiment in FIG. 3. Assume that pressure measurements are required over the range from 760 to 1,000 mmHg, such as found in the human body at sea level. Assume also that $P_1$ is maintained at 880 mmHg initially, and thus varied ±120 mmHg. If a hydrogen electrode is selected and the hydrogen permeation rate across ionomer 16 is $10^{-8}(cm^3/sec)/cm^2$-area/cm— thickness/atm. For a 0.02 cm² area and a 0.05 cm thickness, the diffusion rate will vary between zero and $\pm 6 \, (10)^{-10}$ cm³/sec or about $5(10)^{-5}$ cm³/day. If the volume of gas in reference chamber 12 is 0.05 cm³, then this diffusion represents a change in pressure of ±0.1%/day. That is, if reference chamber 12 pressure is initially at 760 mmHg, it will be stable for long periods, drifting only 0.2%/day if and when used at the maximum 1,000 mmHg level. Therefore, we see that device stability is adequate for all reasonable purposes over low pressure ranges without using diffusion compensation bias current means.

Considering applications of sensor 10 at high pressure ranges, such as 1–10 atmospheres, assume that reference chamber 12 pressure is initially established at 1 atmosphere. If the pressure in sensor chamber 14 is 10 atmospheres, the hydrogen diffusion rate would be $4(10)^{-3}$ cm³/day. For a reference chamber 12 volume of 0.05 cm³, this diffusion represents a drift rate of 8%/day. A 3.3 microampere bias current opposed to the direction of this diffusional flow will maintain a constant 1 atmosphere pressure in reference chamber 12, according to Equation (4) above.

An important feature of the present invention is the capability for self-calibration of the sensor embodiment illustrated in FIGS. 1 and 4. The following discussion demonstrates how the known volumes $V_1$ and $V_2$ shown in FIG. 4 can be used to compute unknown pressures $P_1$ and $P_2$ for any dual-chamber electrochemical pressure sensor.

The calculation of $P_1$ and $P_2$ are based on the relationship of open circuit voltage E and pressure ratio $P_R$ from Equation (1):

$$E = \frac{RT}{nF} \log(P_1/P_2) \tag{5}$$

First, measure E, which will yield $$\frac{P_2}{P_1} = e^{bE} \quad \text{Where:} \quad b = \frac{nF}{RT}$$

At 25° C., b=1/29.5 (mV)$^{-1}$0.078(mV)$^{-1}$
The relationship for drive current I (amps) for time t (seconds) in either direction is then:

$$aI = -V_1 \frac{dP_2}{dt},$$

where a≈0.12 ml-atm/amp-sec
The pressures now become:

$$P_1 - A = P_1 - \frac{aIt}{V_1} \tag{6}$$

$$P_2 + B = P_2 + \frac{aIt}{V_2}$$

Measure the new open circuit voltage E' such that $$\frac{P_2 + B}{P_1 - A} = e^{bE} = \frac{P_2 + \frac{aIt}{V_2}}{P_1 - \frac{aIt}{V_1}}$$

$$P_1 = (aIt)\left(\frac{1}{V_1}\right)\frac{e^{bE} + (V_1/V_2)}{e^{bE'} - e^{bE}} \tag{7}$$

$$P_2 = (aIt)\left(\frac{1}{V_2}\right)\frac{1 + \left(\frac{V_2}{V_1}\right)e^{bE}}{e^{bE'} - e^{bE}}(e^{bE}) \tag{8}$$

Approximating, for small values of bE and bE¹, $$e^{bE^1} = 1 + bE; \; e^{bE^1} = 1 + bE^1; \text{ and}$$
$$e^{bE^1} - e^{bE} = b(E^1 - E).$$

Thus, $$P_1 = \left(\frac{aIt}{V_1}\right)\frac{\left(1 + \frac{V_1}{V_2}\right) + bE}{b(E' - E)} \text{ and } P_2 = (1 + bE) P_1 \tag{9}$$

Figure 5:
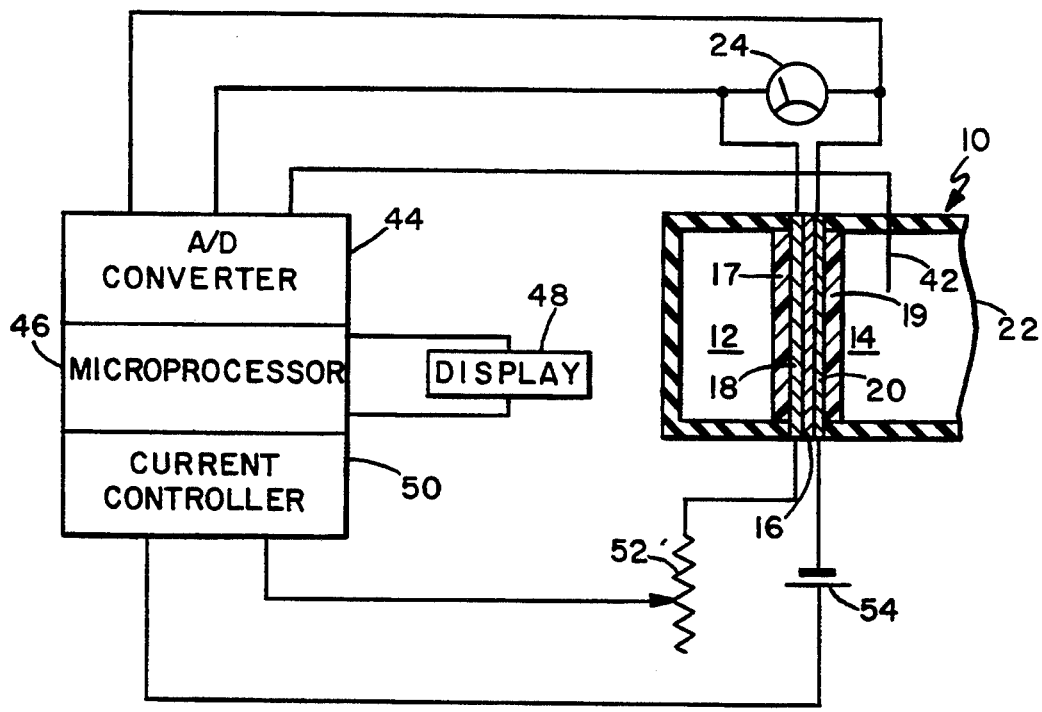
FIG. 5 is a schematic diagram of an electrochemical pressure sensor having provision for diffusion-canceling bias current feedback.

Note that Equations 9 express the pressures $P_1$ and $P_2$ in chambers 12 and 14 (having known Volumes $V_1$ and $V_2$) in terms of voltage measurements E and E' and physical constants a and b. This self-calibration method is useful in a pressure sensor embodiment employing local control means such as are illustrated in FIG. 5. Although a diffusion compensation bias current will minimize sensor calibration drift, the relationships in Equations (9) will allow sensor recalibration at any time to correct for any drift that is not compensated in the bias current.

Referring to FIG. 5, sensor 10 is configured essentially as described above for FIG. 1, with the addition of temperature sensor 42. Temperature sensor 42 is required because Equations 1 and 5 are temperature-dependent. Voltmeter 24 and temperature sensor 42 provide analog signals to A/D converter 44. Converter 44 passes the digital temperature and pressure data to microprocessor 46. Microprocessor 46 performs several functions under stored-program control. First, the pressure data from voltmeter 24 is converted to a form suitable for display 48. The diffusion compensation bias current from Equation 4 is computed by microprocessor 46 and passed to current controller 50, which accordingly adjusts the current level through ionomer membrane 16 by means of variable resistor 52 and voltage source (battery) 54.

For operating conditions where the pressure range is narrow and the temperature is constant, components 42 through 54 can be eliminated, making the embodiment identical to that illustrated in FIG. 1.

Experimental tests of the embodiment illustrated in FIG. 5 (at 24.3° C., with palladium electrodes) has confirmed that the equilibrium voltage equals $50 + 12800$ ln ($P_2/P_1$) in microvolts between 1 and 2 atmospheres. The 50 microvolt bias voltage is probably the result of slight differences between the electrodes or a difference in ion concentration at one of the two electrode-membrane interfaces. The theoretical value of the coefficient is 12818 microvolts, which is substantially identical to the measured value. A voltmeter reading error of 10 microvolts is equivalent to an error in pressure of 0.6 mmHg. At a pressure of 1.5 atm, this is equivalent to a precision of 0.05%, which demonstrates the high precision of the present invention.

Figure 6:
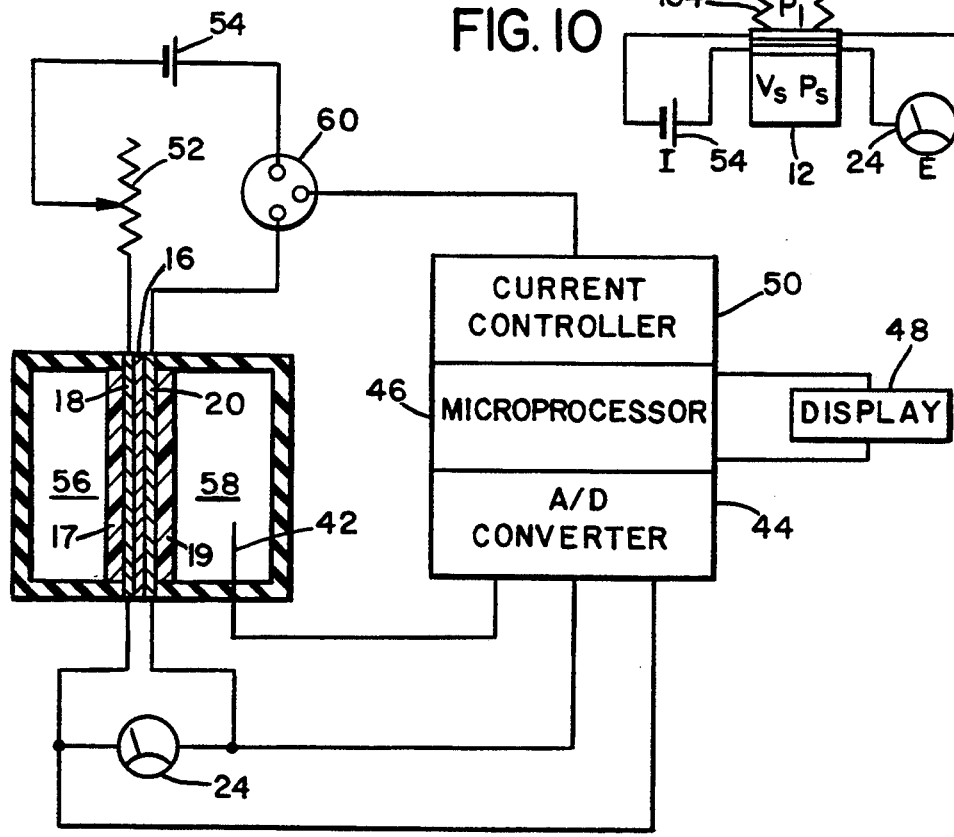
FIG. 6 is a schematic diagram of an electrochemical pressure sensor showing electrical components for dynamic pressure ratio display.

As previously suggested, the electrochemical pressure sensor principle can be used in two different ways to monitor differential pressure within an electrochemical device as illustrated in FIG. 6. One method uses the single pair of drive electrodes to monitor pressure during a brief interrupt period. Assuming that hydrogen gas is used with palladium black electrodes, the gas is shuttled back and forth between the pump chambers 56 and 58 by means of current controller 50 and variable resistor 52. The reciprocating transfer of gas can be part of a work-producing process within an electrochemical motor (not shown). Current controller 50 initiates a current interrupt in the driver circuit by way of interrupter 60. Voltage sensor 24 and temperature sensor 42 provide information to A/D converter 44 and microprocessor 46, which operates on the data to produce the pressure ratio shown by display 48. At the end of the current interrupt, voltage source 54 is reconnected by means of interrupter 60 at the direction of current controller 50. The interrupt duration is approximately 20–50 msec. During the motor operation, the voltage between electrodes 18 and 20 is $V_D = IR_D + 0.013$ ln $P_2/P_1$, where $R_D$ is the resistance of ionic membrane 16. When the drive current is interrupted, $V_D$ decays to $V_0 = V_D - IR_D = 0.013$ ln $P_2/P_1$. If the decay from $V_D$ to $V_0$ is rapid, the pressure ratio can be measured and the current restarted after only a brief delay.

This teaching demonstrates that a very brief current interrupt cycle initiated by stored-program control permits the computation and display of the pressure ratio in an electrochemical motor or a sensor/effector having a single electrode pair. A second method for monitoring pressure within the motor is to use isolated pressure-sensor electrodes on the motor membrane. This second method allows continuous monitoring of pressure, without interruption of the motor drive circuit, in the manner discussed in connection with FIG. 1.

As already mentioned, the dual-chamber sensor of FIG. 1 and 5 is useful for passive or reactive sensing modes. The passive sensing mode merely provides an electrical voltage output, which varies as a function of the measured pressure. The reactive sensing mode provides the pressure sensing output and also maintains a desired pressure at the measurement point in response to a drive current imposed on the sensor. FIG. 8 illustrates a dual-chamber sensor embodiment that will effect a desired force at the measurement point.

Figure 7C:
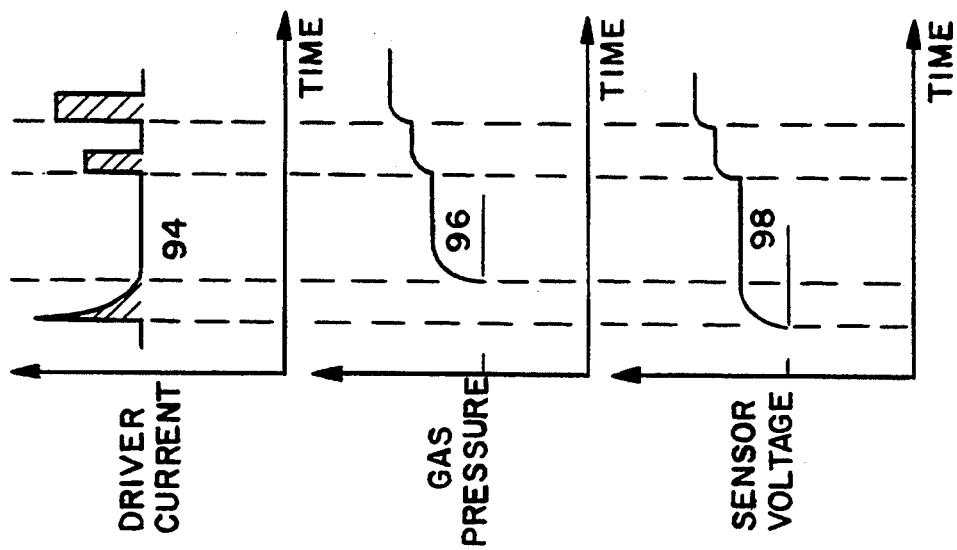
FIGS. 7A, 7B and 7C, illustrates the applied force, gas pressure, and sensor voltage characteristics versus time for both a passive and a reactive electrochemical pressure sensor/effector.
Figure 7B:
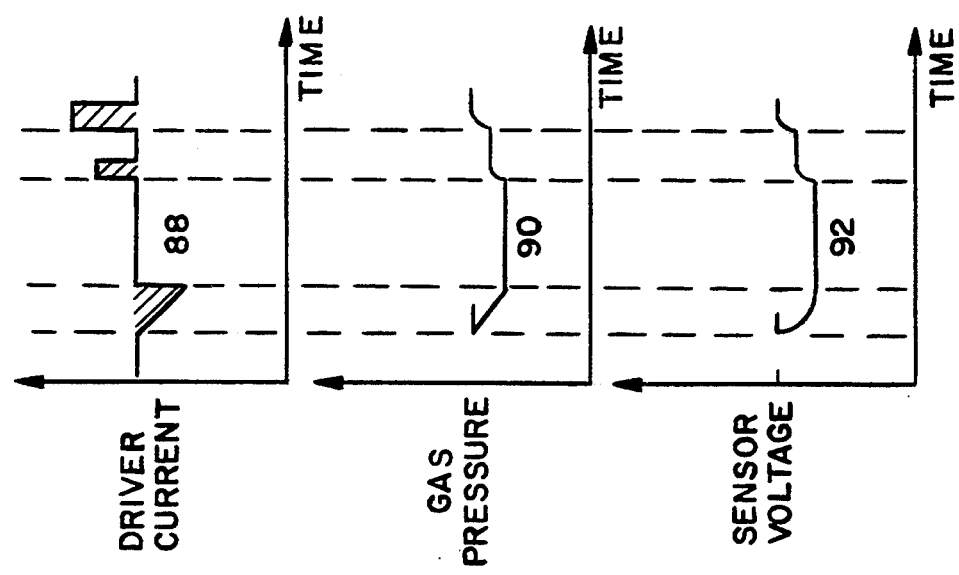
Figure 7A:
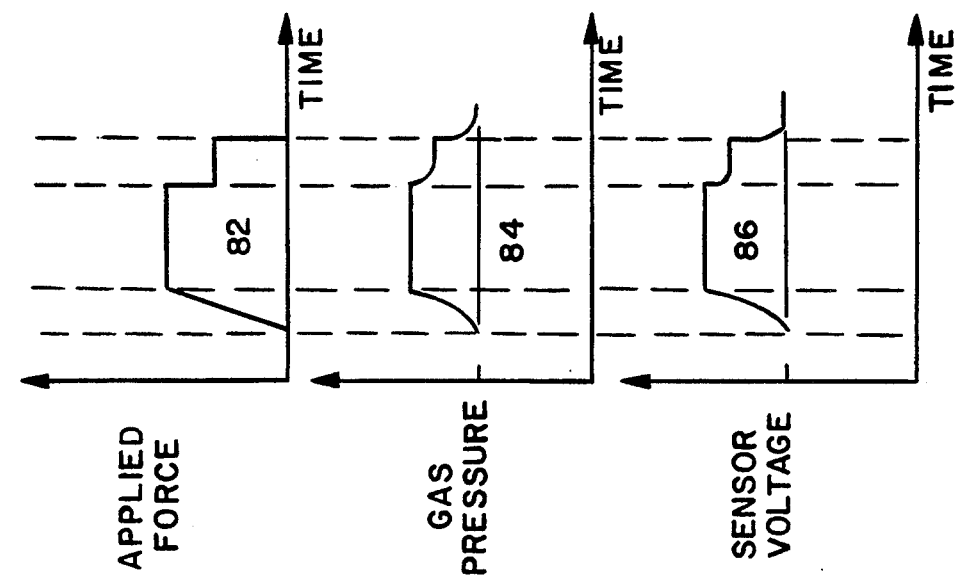

FIG. 7 illustrates the behavior of a reactive contact sensor for various modes of operation. FIG. 7A illustrates the behavior of a passive sensor having no interaction with the applied force. The applied force characteristic 82 causes the gas pressure characteristic 84 and the sensor output voltage characteristic 86. The important feature in FIG. 7A is the similar shape of applied force characteristic 82, gas pressure characteristic 84 and sensor output voltage characteristic 86.

FIG. 7B illustrates sensor operation as a proximity sensor to maintain a zero force contact. The reactive drive current required to maintain a zero net force balance against force characteristic 82 is shown as driver current characteristic 88. The combination of force characteristic 82 and current characteristic 88 results in gas pressure characteristic 90 and sensor output voltage characteristic 92. Note that gas pressure characteristic 90 is essentially flat.

FIG. 7C illustrates a similar sensor reactive mode where the sensor acts as a forced contact sensor or effector to maintain a non-zero contact force. Driver current 94 is imposed on the contact sensor by control means (not shown) responsive to the applied force 82. Gas pressure characteristic 96 and sensor output voltage characteristic 98 result from the combination of force characteristic 82 and current characteristic 94. Note that both pressure and voltage output start at zero and rise quickly to the desired force level, maintaining a substantially fixed force level thereafter.

FIG. 7 shows how a passive sensor responds to an externally applied force by means of a voltage and a reactive sensor maintains a soft contact (zero force) or a hard contact (non-zero force) with the environment in response to stored-program control. The reactive sensor responds to the external force stimulus by applying a current to electrochemical cell membrane 16 which changes the gas pressure in sensor chamber 14. FIG. 8 illustrates such a reactive force sensor.

In FIG. 8, sensor chambers 12 and 14 and rigidly-supported membrane 16 act as described for FIG. 1 above. Electrical conductors 68 and 70 provide access to one or more pairs of sensing electrodes (not shown) and electrical conductors 72 and 74 provide access to one or more independent pairs of active driving electrodes (not shown) on a single membrane 16. Both sets of electrodes are isolated from one another and disposed on either side of membrane 16 in the manner disclosed for FIGS. 1 and 5. Bellows 76 and contactor 78 act to transmit the external force sensed at 80 to sensing chamber 14. In FIG. 8A, chamber 14 is shown larger than chamber 12. In FIG. 8B, chamber 12 is enlarged with respect to chamber 14 and the area of membrane 16 is also enlarged to permit high transfer rates at reasonably constant storage pressure levels in chamber 12.

FIG. 9A shows a multiple reactive force sensor with more than one independent sensor sharing the same reference chamber 12. In this case, each sensor operates separately under local stored-program control and will effect two external forces 180 and 280. In FIG. 9B, the two or more contactors share the same sensor chamber 14. In this case, a single electrolytic membrane 16 will operate to control several contactors having a single sensor chamber 14 pressure, effecting a single external fore 80 with two contactors 178 and 278. It will be appreciated that the illustrated embodiments in FIG. 9A are useful for robotic manipulator applications with the addition of appropriate local microprocessor control routines of a type well-known in the control arts and similar to those mentioned with respect to FIG. 7.

Figure 10:
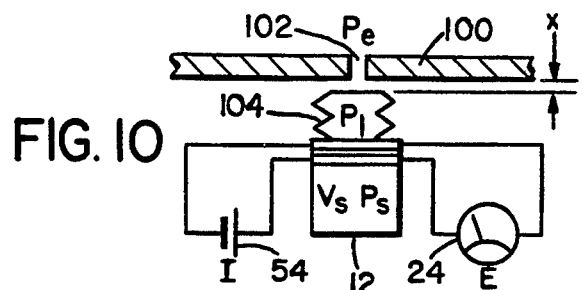
FIG. 10 illustrates a configuration of an electrochemical force sensor/effector having a bellows sensing chamber.

The illustrated embodiment from FIG. 1 can include a bellows or a diaphragm sensing chamber or equivalent. With a bellows sensing chamber, the sensor can be used to measure pressure in a manner that incorporates a self-calibration step. Referring to FIG. 10, this "flexible wall" concept can be understood from the following description.

Consider a rigid wall 100 with an orifice 102 which allows external pressure $P_e$ to pass through and depress bellows 104. The initial state of the sensor exists with no deformation of bellows 104 and with sensor chamber 14 pressure $P_1 = P_e$ such that the end of bellows 104 is in contact with rigid wall 100 (x=0). The volume $V_s$ of storage chamber 12 is known. The pressure $P_s$ of storage chamber 12 is unknown.

The calibration of the sensor is accomplished at $P_e$ less than any pressure within the intended measurement ranges. To calibrate, a current I flows from batter 54 until bellows 104 makes contact with rigid wall 100 as determined by means for monitoring the electrical conductivity from 100 to 104 (not shown). At contact, distance x=0, and $$\frac{P_s}{P_1} = \frac{P_s}{P_e} = e^{bE_1}$$

where b is a physical constant defined earlier and $E_1$ is the sensor voltage output at voltmeter 24.

Because $E_1$ and $P_1 = P_e$ is known, then $$P_s = P_e(e^{bE_1})$$

Following sensor calibration, external pressure $P_e$ is permitted to increase to a value within the intended measurement range, $P_e'$. Bellows 104 moves away from wall 100 by distance x, and voltmeter 24 now reads a voltage $E_2$. We now have the following relationship for sensor chamber pressure $P_2$ $$P_2 - P'_e = \frac{kx}{s}$$

Where k=bellows spring constant $$\frac{P_s}{P_2} = e^{bE_2}$$

Thus; $P_2 = P_s/(e^{bE_2})$ can be computed because $P_s$ and $E_2$ are known.

If bellows 104 is calibrated such that k/s is known, then $P_e' = P_s + kx/s$ can also be computed. If the bellows is not calibrated, $P_e'$ can be found by the following procedure.

Drive current I for time t to reestablish contact between bellows 104 and wall 100. Measure current I, time t and voltmeter 24 voltage $e_3$.

Then:

$$P'_s = P_s - \frac{aIt}{V_s}$$

is the new storage chamber pressure

Where: a = A physical constant defined earlier, and
$P_s$ = the initial storage chamber pressure computed from the earlier calibration step at $P_c$.

Thus, $$\frac{P'_s}{P_3} = \frac{P'}{P_e} = \frac{P_s - \frac{aIt}{V_s}}{P'} = e^{bE_3}$$

Since I, t, b, $E_3$, $V_s$, a, and $P_s$ are known, $$P_3 = P'_e = (P_s - aIt/V_s)/(e^{bE_3})$$

allows computation of the new external pressure, $P_e'$.

This technique is an alternative self-calibrating pressure sensing method suitable for use with the illustrated embodiment of the dual-chamber sensor shown in FIG. 10. Obviously, other embodiments and modifications of the present invention will occur readily to those of ordinary skill in the relevant arts in view of these teachings. Therefore, this invention is to be limited only by the following claims, which include all such obvious embodiments and modifications when viewed in conjunction with the above specification and accompanying drawings.

I claim:

1. A gas pressure ratio sensor comprising:
    a gas-tight housing, having two ends and a first wall at a first end;
    a rigidly-supported electrolytic membrane having two sides disposed to form a second wall at a second end of said gas-tight housing and defining therein a storage chamber for holding a supply of electrochemically active gas;
    at least one pervious electrode disposed on each said side of and in contact with said electrolytic membrane to form at least one opposed electrode pair; the gas being electrochemically reversibly active so as to enter into an anodic reaction at one side of said at least one electrode pair where the gas molecules are convened to ions transportable through said electrolytic membrane and a cathodic reaction at the opposite side of said at least one electrode pair where said ions are reconverted to gas molecules; and
    control means consisting essentially of at least one of the electrode pairs adapted to be responsive to a pressure differential across the electrolytic membrane, means to detect an output voltage from tile electrode pair caused by the pressure differential, which means are in electrical communication with said electrode pair, controller means in electrical communication with the detection means which are programmed to cause a current to be provided to said electrolytic membrane in response to, and sufficient to reverse, the current supplying the detected output voltage to return the pressure in the chamber to a predetermined value.

2. The gas pressure ratio sensor of claim 1 further comprising a semi-pervious covering over the portion of said electrolytic membrane disposed outside of said gas-tight housing, said semi-pervious covering being impervious to water vapor and pervious to said electrochemically active gas.

3. A fluid pressure sensor comprising:
    a fluid-tight housing, having two ends and a first wall at a first end;
    a flexible diaphragm disposed to form a second wall at a second end of said fluid-tight housing and defining therein a storage chamber for holding a supply of electrochemically active gas;

a rigidly-supported electrolytic membrane having two sides disposed between said first and second walls to divide the storage chamber into a smaller storage chamber and a sensor chamber;

at least one pervious electrode disposed on each side of and in contact with the electrolytic membrane to form at least one opposed electrode pair;

the gas being electrochemically reversibly active so as to enter into an anodic reaction at one side of said at least one electrode pair where the gas molecules are convened to ions transportable through said electrolytic membrane and a cathodic reaction at the opposite side of said at least one electrode pair where said ions are reconverted to gas molecules; and control means consisting essentially of at least one of the electrode pairs adapted to be responsive to a pressure differential across the electrolytic membrane, means to detect an output voltage from the electrode pair caused by the pressure differential, which means are in electrical communication with said electrode pair, controller means in electrical communication with the detection means which is programmed to cause a current to be provided to said electrolytic membrane in response to, and sufficient to reverse the current supplying the detected output voltage to return the pressure in each of the chambers to a predetermined value.

4. The fluid pressure sensor of claim 3 wherein:
said fluid-tight housing is disposed inside the tip of a rigid catheter comprising a long hollow cylinder having an interior and an exterior surface.

5. The fluid pressure sensor of claim 3 wherein the controller means are further programmed to provide a electric bias current to at least one electrode pair and opposed to the direction of diffusional flow across the membrane to cancel the effects of said diffusion.

6. The fluid pressure sensor of claim 5 further comprising:
temperature sensing means for determining the temperature of said electrochemically active gas which means are in electrical communication with the controller means; and
wherein said controller means are further programmed to adjust for temperature variations in determining the current to be provided to the electrolytic membrane.

7. A force sensor/effector comprising:
a fluid-tight housing, having two ends and a first wall at a first end;
a flexible bellows having a contacting surface for transferring an external force to said sensor, said flexible bellows disposed to from a second wall at a second end of said fluid-tight housing and defining therein a storage chamber for holding a supply of electrochemically active gas;

a rigidly-supported electrolytic membrane having two sides disposed between said first and second walls to divide said storage chamber into a smaller storage chamber and a sensor chamber;

at least one pervious electrode disposed on each said side of and in contact with the etectrolylic membrane to form at least one opposed electrode pair;

said gas being electrochemically reversibly active so as to enter into an anodic reaction at one side of said at least one electrode pair where the gas molecules are convened to ions transportable through said electrolytic membrane and a carbonic reaction at the opposite side of said at least one electrode pair where said ions are reconverted to gas molecules; and control means consisting essentially of at least one of the electrode pairs adapted to be responsive to a pressure differential across the electrolytic membrane, means to detect an output voltage from the electrode pair caused by the pressure differential, which means are in electrical communication with said electrode pair, controller means in electrical communication with the detect fort means which is programmed to cause a current to be provided to said electrolytic membrane in response to, and sufficient to reverse the current supplying the detected output voltage to return the pressure in each of the chambers to a predetermined value.

8. The sensor of claim 1, 3, or 7 wherein said electrochemically active gas is oxygen ($O_2$).

9. The sensor of claims 1, 3 or 7 wherein said electrochemically active gas is hydrogen ($H_2$).

10. The sensor of claims 1, 3 or 7 wherein additional pervious electrodes are disposed in contact with the electrolytic membrane.

11. The sensor of claims 1, 3 or 7 wherein the control means further comprise a current interrupter programmed to interrupt the current through the electrolytic membrane for at least 20 milliseconds.

12. The sensor of claim 1 or claim 7 wherein the controller means are further programmed to provide an electric bias current opposed to the direction of diffusional flow across said membrane to cancel the effects of said diffusion.

13. The sensor of claim 1 or claim 7 further comprising:
temperature sensing means for determining the temperature of said electrochemically active gas which means are in electrical communication with the controller means, wherein the controller means are further programmed to adjust for temperature variations in determining the current to be provided to the electrolytic membrane.

* * * * *